(12) United States Patent
Cho et al.

(10) Patent No.: US 11,897,184 B2
(45) Date of Patent: Feb. 13, 2024

(54) PHOTO-RESPONSIVE SELF-DEFORMING STRUCTURE AND METHOD OF DRIVING SAME

(71) Applicant: SEOUL NATIONAL UNIVERSITY R&DB FOUNDATION, Seoul (KR)

(72) Inventors: Maeng Hyo Cho, Seoul (KR); Hee Jun Sung, Seoul (KR); Hong Seok Kim, Seoul (KR); Hyun Su Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 394 days.

(21) Appl. No.: 17/043,431

(22) PCT Filed: Jun. 4, 2019

(86) PCT No.: PCT/KR2019/006694
§ 371 (c)(1),
(2) Date: Sep. 29, 2020

(87) PCT Pub. No.: WO2020/141665
PCT Pub. Date: Jul. 9, 2020

(65) Prior Publication Data
US 2021/0016490 A1 Jan. 21, 2021

(30) Foreign Application Priority Data
Jan. 2, 2019 (KR) .................. 10-2019-0000219

(51) Int. Cl.
*B29C 59/00* (2006.01)
*B32B 7/00* (2019.01)
(Continued)

(52) U.S. Cl.
CPC ............. *B29C 59/16* (2013.01); *B29C 59/02* (2013.01); *B32B 7/12* (2013.01); *B32B 27/08* (2013.01);
(Continued)

(58) Field of Classification Search
CPC ......... B29C 59/00; B29C 59/02; B29C 59/10; B29C 59/16; B32B 7/00; B32B 7/10;
(Continued)

(56) References Cited

U.S. PATENT DOCUMENTS
2008/0264058 A1 10/2008 Broer et al.

FOREIGN PATENT DOCUMENTS
JP 2008228368 9/2008
KR 1020130011880 1/2013
(Continued)

OTHER PUBLICATIONS

Morales, et al. "Electro-actuated hydrogel walkers with dual responsive legs" SoftMatter vol. 10 No. 9 Mar. 7, 2014 pp. 1235-1430.
(Continued)

*Primary Examiner* — Jacob T Minskey
*Assistant Examiner* — Matthew Hoover
(74) *Attorney, Agent, or Firm* — Stuart H. Mayer; Kaplan Breyer Schwarz LLP

(57) ABSTRACT

The present invention relates to a photo-responsive shape-changing structure and a driving method thereof. The photo-responsive shape-changing structure (100) is characterized in that it includes a first body portion (200) including at least one polymer film that undergoes a bending deformation in response to light irradiation, a second body portion (300) including at least one polymer film that undergoes a bending deformation in response to light irradiation, and a connection portion (400) configured to allow the first body portion (200) and the second body portion (300) to be connected to each other, wherein adhesive support portions (500, 600) are formed at one ends of the first body portion (200) and the second body portion (300), which are in contact with the ground (20).

7 Claims, 11 Drawing Sheets

(51) Int. Cl.
*B32B 27/00* (2006.01)
*B32B 38/00* (2006.01)
*C09K 19/00* (2006.01)
*B29C 59/16* (2006.01)
*B29C 59/02* (2006.01)
*B32B 7/12* (2006.01)
*B32B 27/08* (2006.01)
*B32B 27/18* (2006.01)
*C09K 19/38* (2006.01)
*C09K 19/54* (2006.01)

(52) U.S. Cl.
CPC .......... *B32B 27/18* (2013.01); *B32B 38/0008* (2013.01); *C09K 19/38* (2013.01); *C09K 19/54* (2013.01); *B32B 2250/04* (2013.01); *B32B 2255/10* (2013.01); *B32B 2255/26* (2013.01); *B32B 2305/55* (2013.01); *B32B 2307/738* (2013.01); *B32B 2310/0831* (2013.01); *B32B 2535/00* (2013.01); *C09K 2219/03* (2013.01)

(58) Field of Classification Search
CPC ........... B32B 7/12; B32B 27/00; B32B 27/08; B32B 27/10; B32B 27/18; B32B 38/00; B32B 38/0008; C09K 19/00; C09K 19/30; C09K 19/38; C09K 19/50; C09K 19/54

See application file for complete search history.

(56) References Cited

FOREIGN PATENT DOCUMENTS

| KR | 1020160017278 | 2/2016 |
| KR | 1020170137449 | 12/2017 |
| KR | 1018172250000 | 1/2018 |

OTHER PUBLICATIONS

Lin et al. "GoQBot: a caterpillar-inspired soft-bodied rolling robot" Bioinsp. Biomim. 6 (2011) 026007 (14pp).

Heejun et al. "Photomobile polymer materials: Soft robot using photo responsive self deforming with joint structures" 2018, 2 pages.

Kim et al., "Azobenzene liquid-crystalline polymer for operation of the gear using the S-motion mechanism", The Korean Society of Mechanical Engineers, 2008, pp. 1272-1274.

(i)

(j)

(k)

(l)

PHOTO-RESPONSIVE SELF-DEFORMING STRUCTURE AND METHOD OF DRIVING SAME

TECHNICAL FIELD

The present invention relates to a photo-responsive shape-changing structure and a driving method thereof. More specifically, the present invention relates to a photo-responsive structure capable of controlling bending deformation by light irradiation and a driving method thereof.

BACKGROUND ART

Recently, a great deal of research has been conducted to apply intelligent composite actuators that exhibit mechanical responses to external stimuli to actively or manually control a structure.

In general, an intelligent composite actuator uses an intelligent material, such as a shape-memory alloy, a piezo-electric material, and an electro-active polymer, and may be used in the form of a driver by directly attaching such an intelligent material to a structure or by inserting such an intelligent material into other materials.

In Korean Patent Application Publication No. 10-2013-0011880, one example of an intelligent composite actuator is disclosed. The composite actuator disclosed in the document includes an intelligent material whose shape can be deformed in response to an external signal such as a current signal and a directional material which can support the intelligent material, regulate an exterior shape, and suppress deformation in a specific direction, and realizes the deformation of the composite actuator by a combination of the arrangement form of the intelligent material and the deformation suppressing directivity of the directional material.

In addition, in Korean Patent Application Publication No. 10-2016-0017278, deformation is realized using a wire instead of an intelligent material. As a wire is pulled by an external force, a composite actuator is bent or twisted.

Also, Korean Patent Publication No. 10-2017-0137449 implements a deformation by which a photo-responsive composite actuator passes through a labyrinth.

In this way, known composite actuators need to supply heat or electric energy to generate heat energy in a material, or provide direct mechanical tension in order to cause deformation.

Meanwhile, in recent years, a variety of studies have been underway regarding the design of an intelligent composite actuator using an azobenzene liquid crystal polymer.

Azobenzene is composed of two benzene rings linked by an N—N double bond, and has a unique property in which two different geometric forms are interconverted by light. Benzene rings linked on both sides based on the N—N double bond of azobenzene are linked by a single bond that is able to freely rotate.

A case where benzene rings at both ends of the N—N double bond are positioned on the same side is referred to as a cis form, and a case where benzene rings are positioned on opposing sides is referred to as a trans form. Azobenzene undergoes photo-isomerization in which the molecular structure thereof is converted from a trans form to a cis form upon irradiation with UV rays, and the molecular structure thereof is converted from a cis form to a trans form upon irradiation with visible rays.

An azobenzene liquid crystal polymer is an azobenzene-based liquid crystal polymer including azobenzene or an azobenzene derivative (hereinafter, referred to as "azobenzene"), and has a photo-responsive behavior characteristic due to photo-isomerization of azobenzene. When a liquid crystal polymer with azobenzene in a trans form is irradiated with UV rays, azobenzene is isomerized, which induces nematic-isotropic phase transition characteristics of an adjacent liquid crystal polymer, and thereby bending deformation in which a polymer material is bent in a direction of receiving light occurs. Also, the photo-responsive deformation of such an azobenzene liquid crystal polymer, which is a reversible reaction, is known to return to an original form upon irradiation with visible rays.

Recently, research on the manufacture of an actuator such as a photo-responsive actuator or the like using photo-responsive deformation characteristics of such an azobenzene liquid crystal polymer has been actively conducted, and in order to utilize these photo-responsive deformation characteristics of the azobenzene liquid crystal polymer, it is necessary to determine the directivity of photo-deformation through alignment.

Technical Problem

An objective of the present invention is to provide a photo-reactive shape-changing structure capable of controlling bending deformation using a cis-trans conversion of an azobenzene liquid crystal polymer and a driving method thereof.

Also, another objective of the present invention is to provide a photo-responsive shape-changing structure capable of moving, walking, ascending, descending, and the like through light irradiation and a driving method thereof.

However, these objectives are exemplary, and the scope of the present invention is not limited thereto.

Technical Solution

According to one aspect of the present invention for achieving the above objectives, there is provided a photo-responsive shape-changing structure including: a first body portion comprising at least one polymer film that undergoes a bending deformation in response to light irradiation; a second body portion comprising at least one polymer film that undergoes a bending deformation in response to light irradiation; and a connection portion configured to allow the first body portion and the second body portion to be connected to each other, wherein adhesive support portions are formed at one ends of the first body portion and the second body portion, which are in contact with the ground.

According to one embodiment of the present invention, the first body portion may include a 1-1 polymer film and a 1-2 polymer film that each undergo a bending deformation in response to light irradiation, and the second body portion may include a 2-1 polymer film and a 2-2 polymer film that each undergo a bending deformation in response to light irradiation.

According to one embodiment of the present invention, a first restricting portion may be formed between the 1-1 polymer film and the 1-2 polymer film and a second restricting portion may be formed between the 2-1 polymer film and the 2-2 polymer film.

According to one embodiment of the present invention, the polymer film may include a polymer scaffold film, an azobenzene liquid crystal polymer applied on a surface of the polymer scaffold film by immersing the film in the polymer, and a protective film attached to a surface of the azobenzene liquid crystal polymer.

According to one embodiment of the present invention, an adhesive strength between the adhesive support portions and the ground may be less than a force that causes bending deformation of the polymer film upon light irradiation.

According to one embodiment of the present invention, the connection portion may connect the other ends of the first body portion and the second body portion to each other and act as a joint to allow for bending or twisting deformation of the first body portion and the second body portion.

According to one embodiment of the present invention, the first body portion and the second body portion may be provided in plurality.

According to another aspect of the present invention for achieving the above objectives, there is provided a method of driving a photo-responsive shape-changing structure which comprises a first body portion comprising at least one polymer film that undergoes a bending deformation in response to light irradiation, a second body portion comprising at least one polymer film that undergoes a bending deformation in response to light irradiation, and a connection portion configured to allow the first body portion and the second body portion to be connected to each other, wherein adhesive support portions are formed at one ends of the first body portion and the second body portion, which are in contact with the ground, the method including the steps of: (a) producing a bending deformation by irradiating the polymer film of the first body portion and releasing the adhesive support portion of the first body portion from the contact with the ground; (b) causing the first body portion to move forward by producing a bending deformation by irradiating the polymer film of the second body portion; (c) producing a bending deformation in a direction opposite to that of the step (a) by irradiating the polymer film of the first body portion, and bringing the adhesive support portion of the body portion into contact with the ground; (d) producing a bending deformation in a direction opposite to that of the step (c) by irradiating the polymer film of the second body portion that is positioned at least below an irradiated portion of the step (b), and allowing the second body portion to move forward while releasing the adhesive support portion of the second body portion from the contact with the ground; and (e) producing a bending deformation in a direction opposite to that of the step (d) by irradiating the polymer film of the second body portion, and bringing the adhesive support portion of the second body portion into contact with the ground.

According to one embodiment of the present invention, the first body portion may include a 1-1 polymer film and a 1-2 polymer film that each undergo a bending deformation in response to light irradiation, the second body portion may include a 2-1 polymer film and a 2-2 polymer film that each undergo a bending deformation in response to light irradiation, a first restricting portion may be formed between the 1-1 polymer film and the 1-2 polymer film, and a second restricting portion may be formed between the 2-1 polymer film and the 2-2 polymer film.

According to one embodiment of the present invention, the step (a) may include producing the bending deformation by irradiating the 1-1 polymer film of the first body portion and releasing the adhesive support portion formed on the 1-1 polymer film from the contact with the ground, the step (b) may include allowing the first body portion to move forward as a pushing force is applied to the first body portion by producing the bending deformation by irradiating the 2-1 polymer film of the second body portion, the step (c) may include producing the bending deformation in a direction opposite to that of the step (a) by irradiating the 1-1 polymer film of the first body portion, and bringing the adhesive support portion formed on the 1-1 polymer film into contact with the ground, the step (d) may include producing the bending deformation in a direction opposite to that of the step (b) by irradiating the 2-1 polymer film and the 2-2 polymer film of the second body portion, and allowing the second body portion to move forward, and the step (e) may include producing the bending deformation in a direction opposite to that of the step (d) by irradiating the 2-1 polymer film, and bringing the adhesive support portion formed on the 2-1 polymer film into contact with the ground.

Advantageous Effects

According to one embodiment of the present invention made as described above, it is possible to implement a photo-responsive shape-changing structure capable of controlling bending deformation using cis-trans conversion of an azobenzene liquid crystal polymer and a driving method thereof.

Also, according to one embodiment of the present invention, there is an effect of being capable of moving, walking, ascending, descending, and the like by light irradiation.

In addition, according to one embodiment of the present invention, the photo-responsive shape-changing structure undergoes a reaction through light of a specific wavelength band without thermal reaction, and since the reaction is a reversible reaction, it is possible for repetitive behavior to occur, so that a certain motion can be continuously repeated.

Additionally, according to one embodiment of the present invention, photoreaction is possible, which allows for repeating the same motion even when in a transparent case or under water, and hence it is possible to be driven in various environments.

In addition, an input required for an operation is light, which enables environmentally benign operation, and an effect is achieved in that active control is possible according to the position, intensity, and time of light irradiation specified by a user.

It should be understood that the scope of the present invention is not limited by these effects.

DESCRIPTION OF REFERENCE NUMERALS

100: PHOTO-RESPONSIVE SHAPE-CHANGING STRUCTURE

Figure 1:
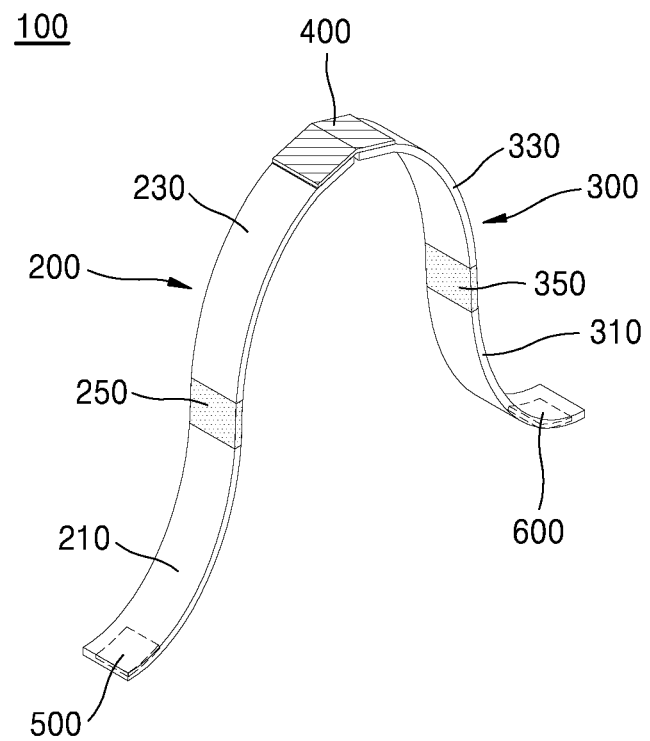
FIG. 1 is a schematic diagram illustrating a photo-responsive shape-changing structure according to one embodiment of the present invention.

200: FIRST BODY PORTION
210: 1-1 POLYMER FILM
230: 1-2 POLYMER FILM
250: FIRST RESTRICTING PORTION
300: SECOND BODY PORTION
310: 2-1 POLYMER FILM
330: 2-2 POLYMER FILM
350: SECOND RESTRICTING PORTION
400: CONNECTION PORTION
500, 600: ADHESIVE SUPPORT PORTION

MODE FOR INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different from one another, are not necessarily mutually exclusive. For example, a particular feature, structure, and characteristic described herein in connection with one embodiment may be implemented within other embodiments without departing from the spirit and scope of the present invention. Also, it should be understood that the positions or arrangements of individual elements in the embodiment may be changed without departing from the spirit and scope of the present invention. Accordingly, the following detailed description is not intended to be restrictive, and the scope of the present invention is determined only by the accompanying claims along with equivalents of what is claimed by the claims, if properly explained. In the drawings, like reference numerals denote like elements and lengths, areas, thicknesses or shapes may be exaggerated for the sake of convenience.

Hereinafter, preferred embodiments of the present invention will be described in detail with reference to the accompanying drawings in order to enable those skilled in the art to easily implement the present invention.

FIG. 1 is a schematic diagram illustrating a photo-responsive shape-changing structure 100 according to one embodiment of the present invention.

Referring to FIG. 1, the photo-responsive shape-changing structure according to one embodiment of the present invention may include a first body portion 200, a second body portion 300, and a connection portion 400. In addition, adhesive support portions 500 and 600 may be formed at one ends (lower ends) of the first body portion 200 and the second body portion 300, which are in contact with the ground.

The first body portion 200 may correspond to a front portion of the photo-responsive shape-changing structure 100. The first body portion 200 may act as a front foot when the photo-responsive shape-changing structure 100 moves.

The first body portion 200 may include at least one polymer film 210 or 230 that can undergo a bending deformation in response to light irradiation. In the present specification, a description is made under the assumption that the first body portion 200 includes a 1-1 polymer film 210 and a 1-2 polymer film 230, but the first body portion 200 may be formed to include only one elongated polymer film.

The polymer film 10 may undergo a bending deformation in response to light irradiation. More specifically, the polymer film 10 may control bending deformation using cis-trans conversion of an azobenzene liquid crystal polymer, and may undergo a bending deformation through light of a specific bandwidth without thermal reaction. The 1-1 polymer film 210, the 1-2 polymer film 230, a 2-1 polymer film 310, a 2-2 polymer film 330, and the like may have the same composition as the polymer film 10.

Since the bending deformation of the polymer film 10 is a reversible reaction, it is possible for repetitive behavior to occur, so that a certain motion can be continuously repeated, and the same motion can be repeated even when in a transparent case or under water, which makes it possible to be driven in various environments.

Figure 2:
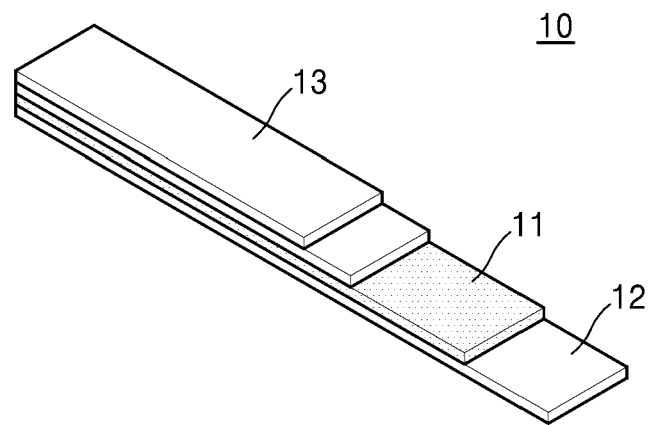
FIG. 2 is a schematic diagram illustrating a polymer film having photo-responsive property according to one embodiment of the present invention.

FIG. 2 is a schematic diagram illustrating a polymer film 10 having photo-responsive property according to one embodiment of the present invention.

As shown in FIG. 2, the polymer film 10 may include a polymer scaffold film 11, an azobenzene liquid crystal polymer 12 applied on a surface of the polymer scaffold film 11 by immersing the film in the polymer, and a protective film 13 attached to a surface of the azobenzene liquid crystal polymer (12).

Specifically, the polymer scaffold film 11 is a polymeric scaffold prepared in a film form. As the polymeric scaffold film 110, various materials such as poly(lactic acid) (PLA), poly(D,L-lactic-co-glycolic acid) (PLGA), poly(dimethylsiloxane) (PDMS), polycaprolactone (PCL) and the like may be used.

The polymeric scaffold is, for example, a two-dimensional weaving material with a ribbon or mesh structure prepared by spinning and discharging a polymer fiber having a μm- or nm-scale diameter onto a dust-collecting plate through an electrospinning process. However, the polymeric scaffold film according to the present invention is not limited to a specific processing method or a micro structure. The polymeric scaffold may be fabricated, for example, through a micromolding process and a spincoating process for forming a polymer matrix with a pun-scale porous pattern or a microsyringe deposition method in which a polymer in a gel state is put into a syringe and then a two-dimensional pattern is drawn through a micro-needle located at an outermost edge of the syringe.

The azobenzene liquid crystal polymer 120 is applied on the polymeric scaffold film by permeating the polymer into a pattern in the film.

More specifically, the azobenzene liquid crystal polymer 12 is an azobenzene-based liquid crystal polymer containing azobenzene or azobenzene derivative, and has a photo-responsive behavior characteristic due to photo-isomerization of azobenzene.

Azobenzene is composed of two benzene rings linked by an N—N double bond, and has a unique property in which two different geometric forms are interconverted by light. Benzene rings linked on both sides based on the N—N double bond of azobenzene are linked by a single bond that is able to freely rotate. A case where benzene rings at both ends of the N—N double bond are positioned on the same side is referred to as a cis form, and a case where benzene rings are positioned on opposing sides is referred to as a trans form. Azobenzene undergoes photo-isomerization in which the molecular structure thereof is converted from a trans form to a cis form upon irradiation with UV rays, and the molecular structure thereof is converted from a cis form to a trans form upon irradiation with visible rays.

That is, when a liquid crystal polymer with azobenzene in a trans form is irradiated with UV rays, azobenzene is isomerized, which induces nematic-isotropic phase transition characteristics of an adjacent liquid crystal polymer, and thereby bending deformation in which a polymer material is bent in a direction of receiving light occurs. As the photo-responsive deformation of the azobenzene liquid crystal polymer is a reversible reaction, the azobenzene liquid crystal polymer may be deformed to its original form upon irradiation with visible rays.

The protective film 13 may be attached to a surface of the azobenzene liquid crystal polymer 12. The protective film 130 supports a composite actuator so that a fracture does not occur even at high tension, and a flexible material which does not degrade the bending deformation of a composite actuator is used as the protective film.

When a position where bending is required in the polymer film 10 thus manufactured is irradiated with UV rays using a UV laser or UV LED, a surface which is irradiated with UV rays is locally contracted, and thus bending deformation occurs throughout the polymer film.

A direction in which bending deformation occurs may be an upper surface or lower surface of the polymer film according to a direction in which light is radiated, but, according to the present invention, the deformation characteristics of the polymer film are not related to an alignment direction of azobenzene molecules in the azobenzene liquid crystal polymer 12 applied on the polymeric scaffold film 11. That is, according to the present invention, the azobenzene liquid crystal polymer 12 does not require separate alignment other than being applied on the polymeric scaffold film 11.

A first restricting portion 250 may be formed between the 1-1 polymer film 210 and the 1-2 polymer film to allow the 1-1 polymer film 210 and the 1-2 polymer film 230 to be connected to each other.

The first restricting portion 250 may be formed to connect the 1-1 polymer film 210 and the 1-2 polymer film such that the 1-1 polymer film 210 and the 1-2 polymer film 230 undergo multiple bending deformations in different or the same directions. The first restricting portion may be formed of a tape that does not transmit light.

For example, the 1-1 polymer film 210 is formed at one side of the first restricting portion 250, and the 1-2 polymer film 230 is formed at the other side, and thereby, when light is irradiated to the 1-1 polymer film 210, the light is not transmitted to the 1-2 polymer film 230, and thus bending deformation may occur only in the 1-1 polymer film 210, and when light is irradiated to the 1-2 polymer film 230, the light is not transmitted to the 1-1 polymer film 210, and thus bending deformation may occur only in the 1-2 polymer film 230.

Meanwhile, the 1-1 polymer film 210 and the 1-2 polymer film 230 may be formed integrally as an elongated polymer film, and the first restricting portion 250 formed of a tape that does not transmit light may be attached to the middle of the polymer film to separate the 1-1 polymer film 210 and the 1-2 polymer film 230, thereby allowing the 1-1 polymer film 210 formed on the lower part and the 1-2 polymer film formed on the upper part to individually react.

The second body portion 300 may correspond to a rear portion of the photo-responsive shape-changing structure 100. The second body portion 200 may act as a rear foot when the photo-responsive shape-changing structure 100 moves.

The second body portion 300 may include at least one polymer film 310 or 330 that can undergo a bending deformation in response to light irradiation. In the present specification, a description is made under the assumption that the second body portion 300 includes the 2-1 polymer film 310 and the 2-2 polymer film 330, but the second body portion 300 may be formed to include only one elongated polymer film.

A second restricting portion 350 may be formed between the 2-1 polymer film 310 and the 2-2 polymer film to allow the 2-1 polymer film 310 and the 2-2 polymer film 330 to be connected to each other.

The configuration of the second body portion 300 is the same as that of the first body portion 200, and hence a detailed description thereof is omitted hereinafter.

Figure 9:
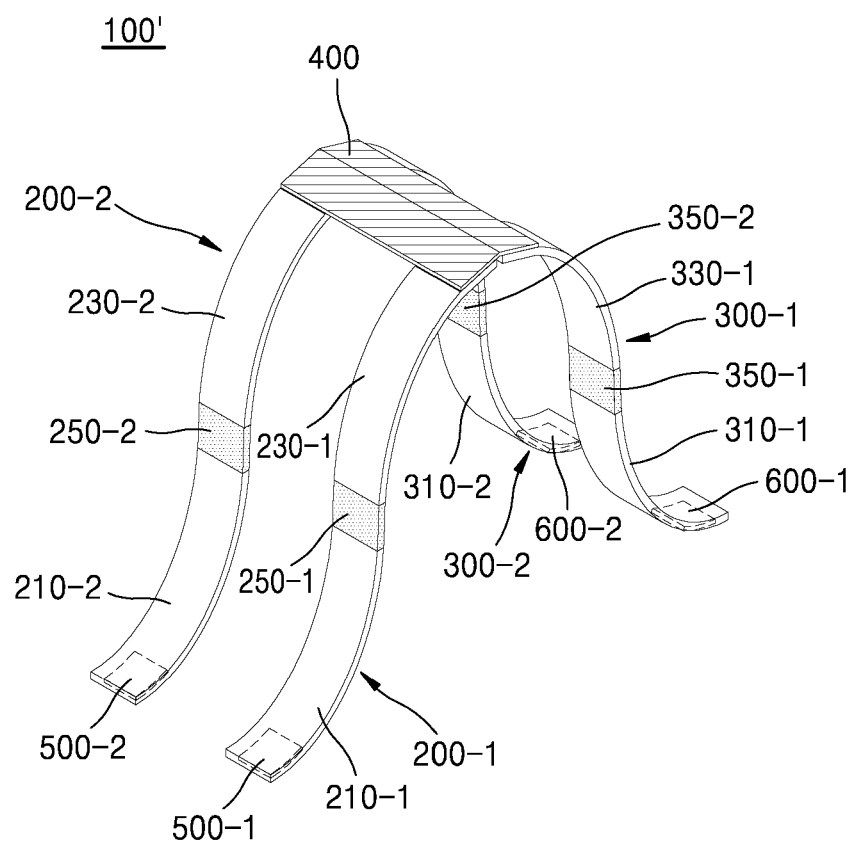
FIG. 9 is a schematic diagram illustrating a photo-responsive shape-changing structure according to another embodiment of the present invention.

The connection portion 400 may connect at least one first body portion 200 and at least one second body portion 300. FIG. 1 illustrates that the connection portion 400 connects one first body portion 200 with one second body portion, and FIG. 9 illustrates that the connection portion 400 connects two first body portions 200 with two second body portions 300. The number of first body portions 200 and the second body portions 300 connected to the connection portion 400 may be appropriately changed according to characteristics of the structure to be realized, and the number of first body portions 200 may be set to be different from the number of second body portions 300. For example, in order to quickly move through a narrow passage, the first body portion 200 and the second body portion 300 may be disposed one by one to implement the photo-responsive shape-changing structure 100 having two feet, as shown in FIG. 1. Also, for example, in order to improve stability in movement, the first body portions 200 and the body portions 300 may be disposed two by two to implement a photo-responsive shape-changing structure 100' having four feet, as shown in FIG. 9. In addition, for example, two first body portions 200 and one second body portion 300 may be disposed to implement a photo-responsive shape-changing structure 100.

The connection portion 400 may connect the first body portion 200 and the second body portion 300 to each other, and at the same time, may act as a joint to allow for deformation, such as bending, twisting, or the like, of the first body portion 200 and the second body portion 300. To this end, the connection portion 400 may employ flexible polymer materials, tapes, other hinge means, and the like without limitation.

The adhesive support portions 500 and 600 may be formed at one ends (lower ends) of the first body portion 200 and the second body portion 300, respectively. The adhesive support portions 500 and 600 may allow the first body portion 200 and the second body portion 300 to be attached to the ground 20 (see FIG. 3) or to touch the ground with a frictional force. The adhesive support portions 500 and 600 may be preferably formed on the surfaces of one ends of the first body portion 200 and the second body portion 300 in order to secure an area in contact with the ground 20. In addition, the adhesive support portions 500 and 600 may be formed of adhesive materials, adhesive tapes, or the like having a predetermined adhesive strength, or rubber, elastic materials, or the like having a frictional force so that the first body portion 200 and the second body portion 300 do not slip when in contact with the ground 20.

The adhesive strength between the adhesive support portions 500 and 600 and the ground 20 may be preferably less than the force that causes bending deformation of the polymer film 10 upon light irradiation. In other words, the adhesive support portions 500 and 600, which are formed, respectively, on the 1-1 polymer film 210 of the first body portion 200 or the 2-1 polymer film 310 of the second body portion 300, may release the adhesion from the ground 20 when the 1-1 polymer film 210 and the 2-1 polymer film 310 undergo bending deformation in response to light irradiation. As the adhesive support portion 500 on the 1-1 polymer film 210 and the adhesive support portion 600 on the 2-1 polymer film 310 release the adhesion from the ground 20, the 1-1 polymer film 210 and the 202 polymer film 310 may slide without being supported by the ground 20. Accordingly, it is possible to move the first body portion 200 and the second body portion 300.

FIGS. 3 to 8 illustrate an operation process of a photo-responsive shape-changing structure 100 according to one embodiment of the present invention. Hereinafter, the left direction, which is a direction in which the photo-responsive shape-changing structure 100 moves, will be referred to as a "front direction," moving to the left will be referred to as "moving forward (FW)," and the left surface of each of the polymer films 210, 230, 310, and 330 will be referred to as a "front surface". The contrary cases will be respectively referred to as a "rear direction," "moving backward," and a "rear surface". In addition, for convenience of description, a state in which each of the polymer films 210, 230, 410, and 330 is bent to the left (in the front direction) will be referred to as a "first shape", and a state in which each of the polymer films is bent to the right (in the rear direction) will be referred to as a "second shape".

The photo-responsive shape-changing structure 100 and a system for driving the same are illustrated with reference to FIGS. 3 to 8. Light emitters 51 to 58 capable of emitting light, such as UV light, visible light, and the like, may be disposed on both surfaces of each of the polymer films 210, 230, 310, and 330. However, the present invention is not limited thereto, and fewer light emitters may be installed on a moving means (not shown) to emit light to both surfaces of each of the polymer films 210, 230, 310, and 330.

Figure 3:
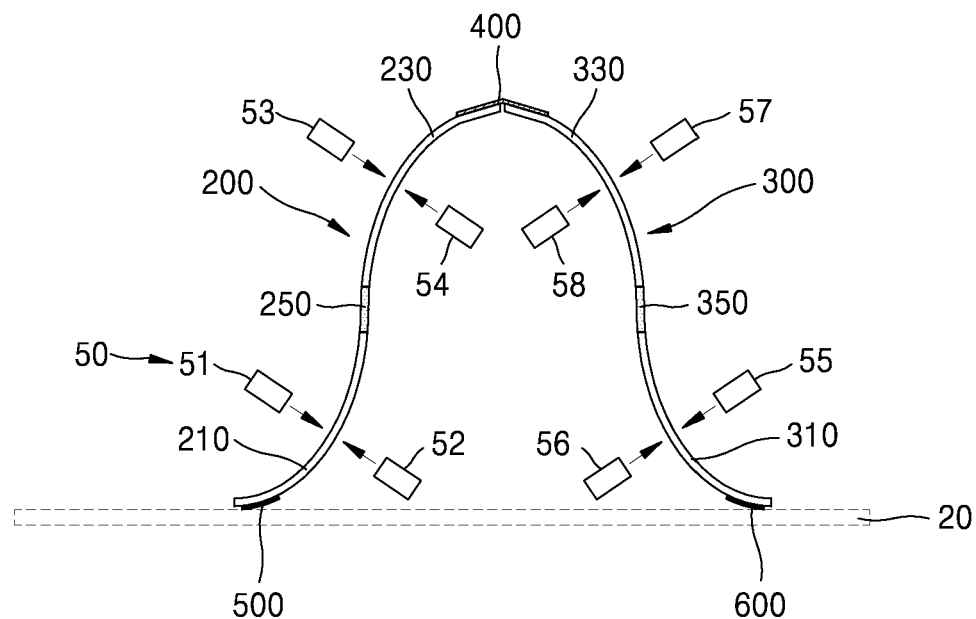
FIGS. 3 to 8 illustrate an operation process of a photo-responsive shape-changing structure according to one embodiment of the present invention.

First, referring to FIG. 3, the adhesive support portions 500 and 600 of the first and second body portions 200 and 300 may be in contact with the ground 20. That is, the 1-1 polymer film 210 and the 2-1 polymer film 310 may be in a bending deformation state so that predetermined areas of the lower parts thereof are in contact with the ground 20. The 1-2 polymer film 230 and the 2-1 polymer film 310 may be in the first shape (bent to the left) and the 1-1 polymer film 210 and the 202 polymer film 330 may be in the second shape (bent to the right). Therefore, the photo-responsive shape-changing structure 100 may remain stationary on the ground 20 without moving.

Figure 4:
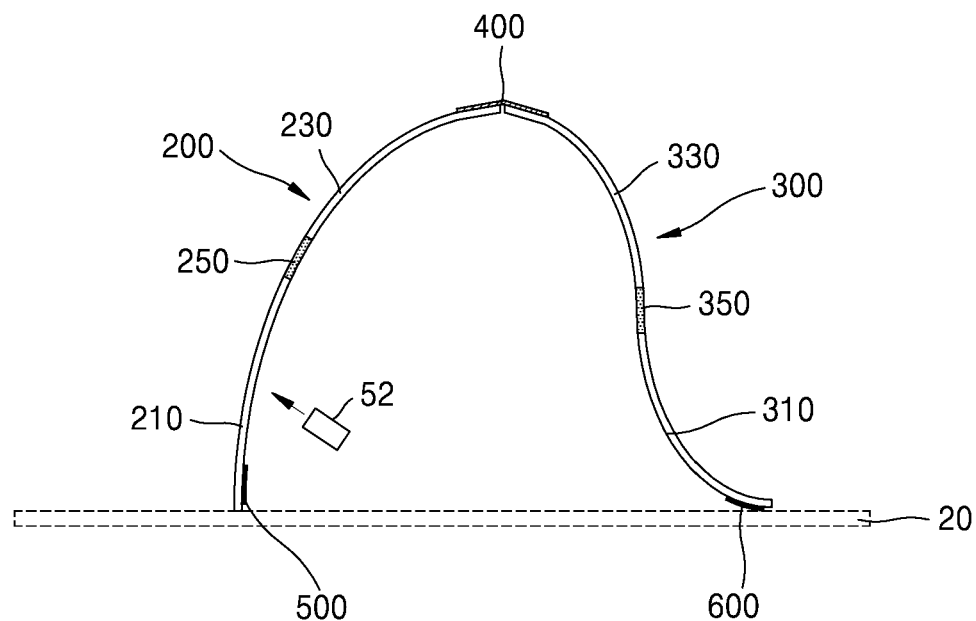

Then, referring to FIG. 4, the light emitter 52 may emit light to the rear surface of the 1-1 polymer film 210. The 1-1 polymer film 210 may be bent in the front direction and deformed from the second shape to the first shape. At the same time, since a force that causes bending deformation of the 1-1 polymer film 210 is stronger than an adhesive strength of the adhesive support portion 500 to the ground 20, the adhesive support portion 500 may be released from the contact with the ground 20 and separated from the ground.

Figure 5:
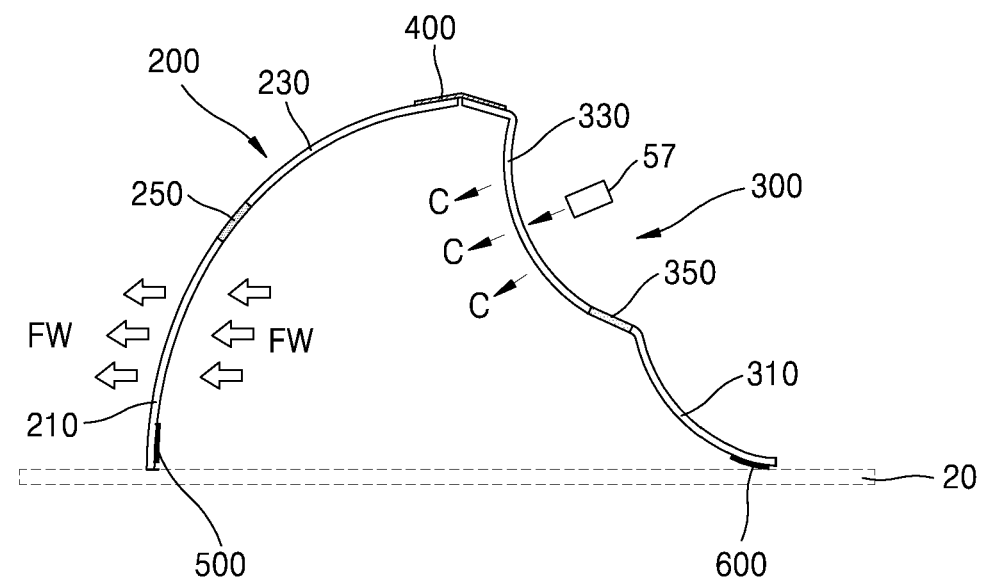

Then, referring to FIG. 5, the light emitter 57 may emit light to the rear surface of the 2-2 polymer film 330. The 2-2 polymer film may be bent in the front direction and deformed from the second shape to the first shape. As the 2-2 polymer film 330 undergoes a bending deformation, it may apply a pressing force C toward the front direction. Since the adhesive support portion 500 of the first body portion 200 is not in contact with the ground 20, the pressing force C may cause the first body portion 200 to move forward FW a predetermined distance.

Figure 6:
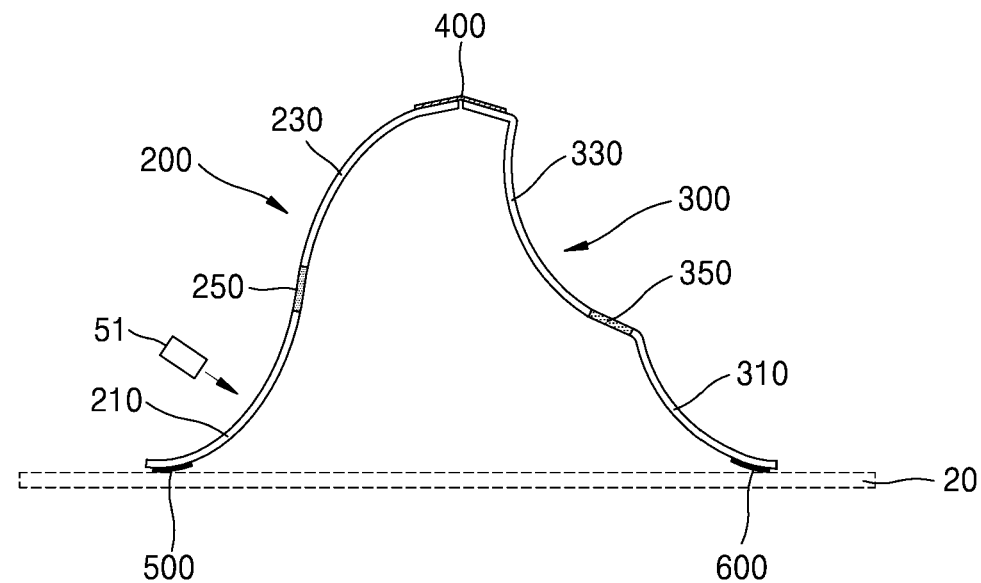

Then, referring to FIG. 6, the light emitter 51 may emit light to the front surface of the 1-1 polymer film 210. The 1-1 polymer film 210 may be bent in the rear direction and deformed from the first shape to the second shape. As the 1-1 polymer film 210 is deformed into the second shape, the adhesive support portion 500 of the 1-1 polymer film 210 may come into contact with the ground 20 and the first body portion 200 may be fixed without moving by the contact of the adhesive support portion 500 with the ground 20.

Figure 7:
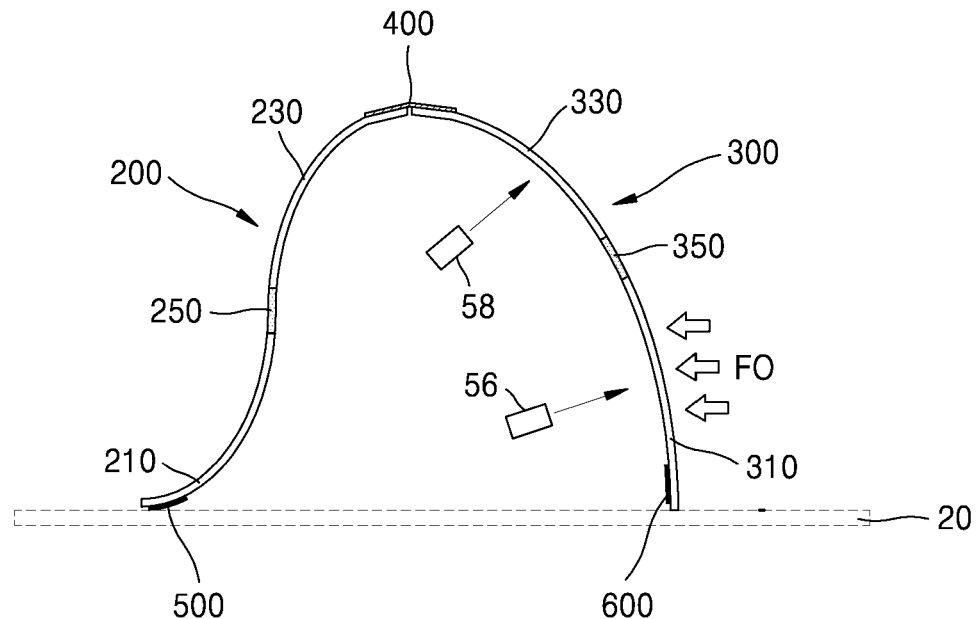

Then, referring to FIG. 7, the light emitters 56 and 58 may emit light to the front surfaces of the 2-1 polymer film 310 and the 2-2 polymer film 330. The 2-1 polymer film 310 and the 2-2 polymer film 330 may be bent in the rear direction and deformed from the first shape to the second shape. As the 2-1 polymer film is deformed into the second shape, the adhesive support portion 600 of the 2-1 polymer film 310 may be released from the contact with the ground 20 and separated from the ground 20. At the same time, the adhesive support portion 500 of the first body portion 200 may remain in contact with the ground 20, and may be pulled FO in the front direction as the 2-1 polymer film 310 and the 2-2 polymer film 330 are deformed into the second shape. Accordingly, the second body portion 300 may move forward.

Figure 8:
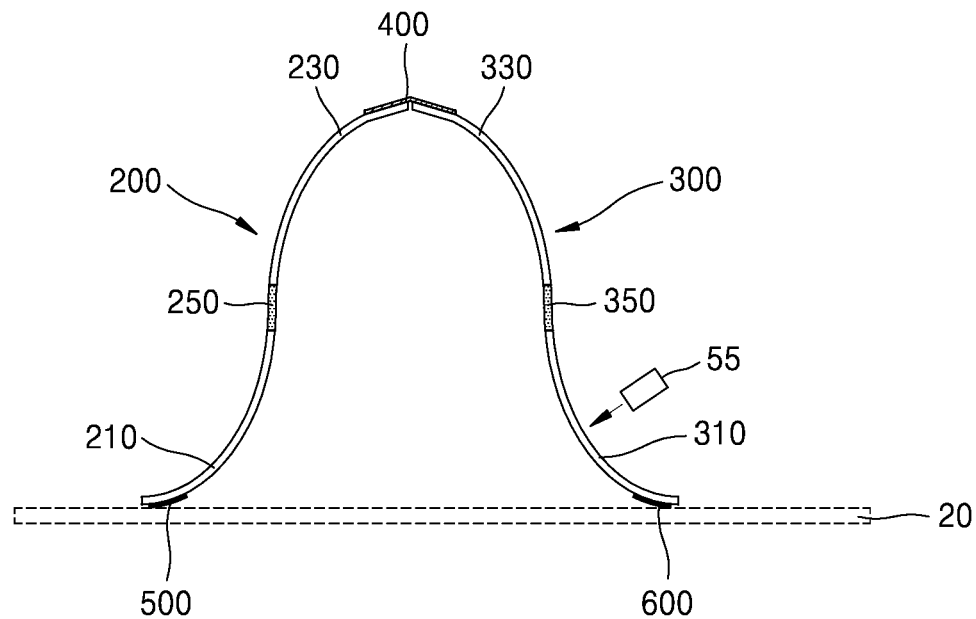

Then, referring to FIG. 8, the light emitter 55 may emit light to the rear surface of the 2-1 polymer film 310. The 2-1 polymer film 310 may be bent in the front direction and deformed from the second shape to the first shape. As the 2-1 polymer film 310 is deformed into the first shape, the adhesive support portion 600 of the 2-1 polymer film 310 may come into contact with the ground 20, and the second body portion 300 may be fixed without moving by the contact of the adhesive support portion 600 with the ground 20.

The state shown in FIG. 8 is the same as the initial state shown in FIG. 3. By repeating the process of FIGS. 3 to 8, the photo-responsive shape-changing structure 100 may perform an operation of moving forward FW as if sliding.

FIG. 9 is a schematic diagram illustrating a photo-responsive shape-changing structure 100' according to another embodiment of the present invention. Hereinafter, only differences from the photo-responsive shape-changing structure 100 of FIG. 1 will be described. It is noted that the same reference numerals/symbols denote the same configurations, but "−1" and "−2" are appended to the reference numerals for components provided in plurality.

Referring to FIG. 9, the photo-responsive shape-changing structure 100' may include a plurality of first body portions 200 (200-1 and 200-2) and a plurality of second body portions 300 (300-1 and 300-2). When the photo-responsive shape-changing structure 100' moves, the two first body portions 200-1 and 200-1 may act as two front feet and the two second body portions 300-1 and 300-2 may act as two rear feet.

Each of the first body portions 200 (200-1 and 200-2) may include, respectively, a 1-1 polymer film 210 (210-1 and 210-2), a 1-2 polymer film 230 (230-1 and 230-2), a first restricting portion 250 (250-1 and 250-2), and an adhesive support portion 500 (500-1 and 500-2).

In addition, each of the second body portions 300 (300-1 and 300-2) may include, respectively, a 2-1 polymer film 310 (310-1 and 310-2), a 2-2 polymer film 330 (330-1 and 330-2), a second restricting portion 350 (350-1 and 350-2), and an adhesive support portion 600 (600-1 and 600-2).

A connection part 400 may connect ends (upper ends) of the two first body portions 200-1 and 200-2 and ends of the two second body portions 300-1 and 300-2 to each other.

Figure 10:
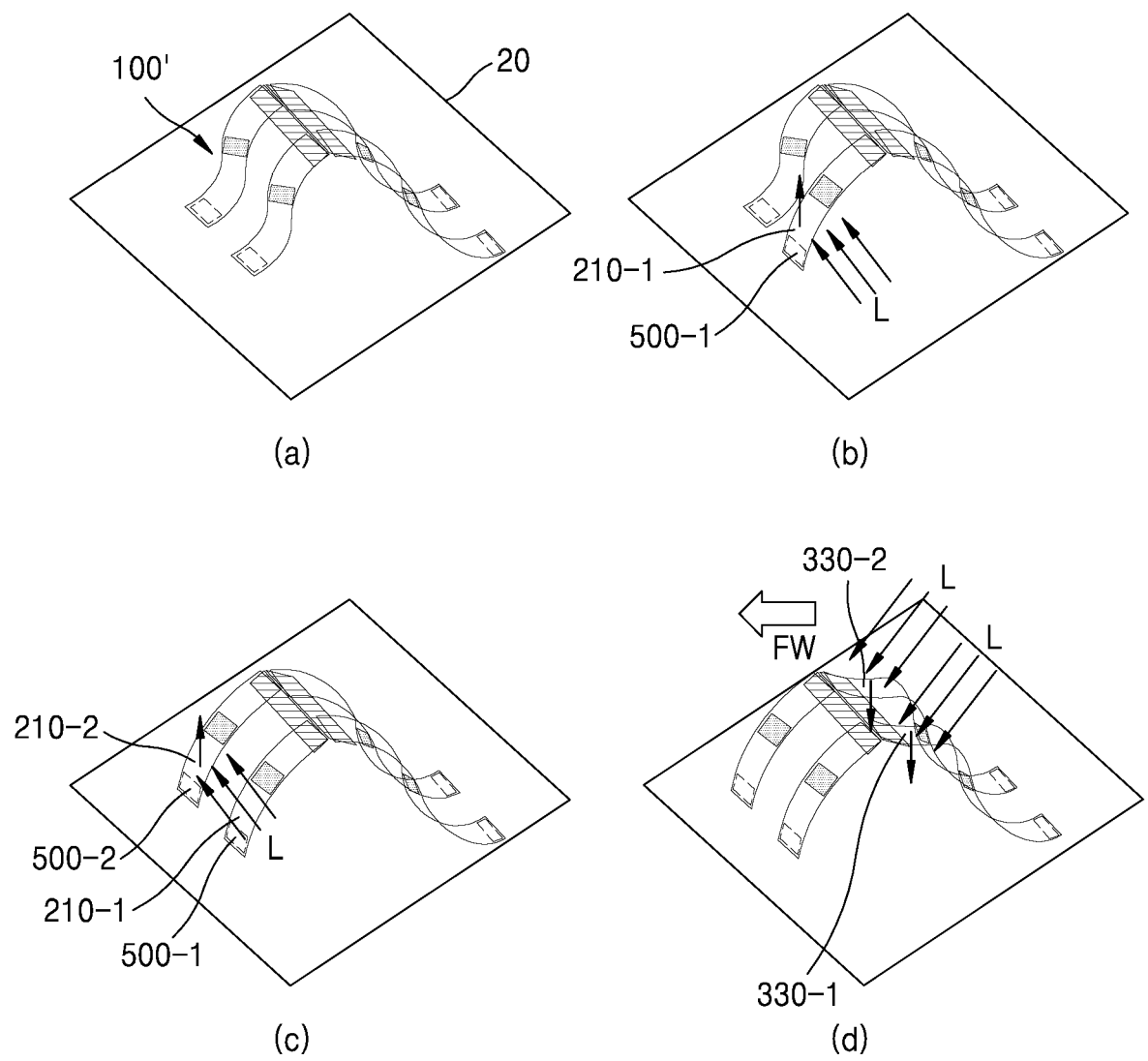
FIGS. 10 to 12 illustrate a forward movement process of a photo-responsive shape-changing structure according to another embodiment of the present invention.
Figure 11:
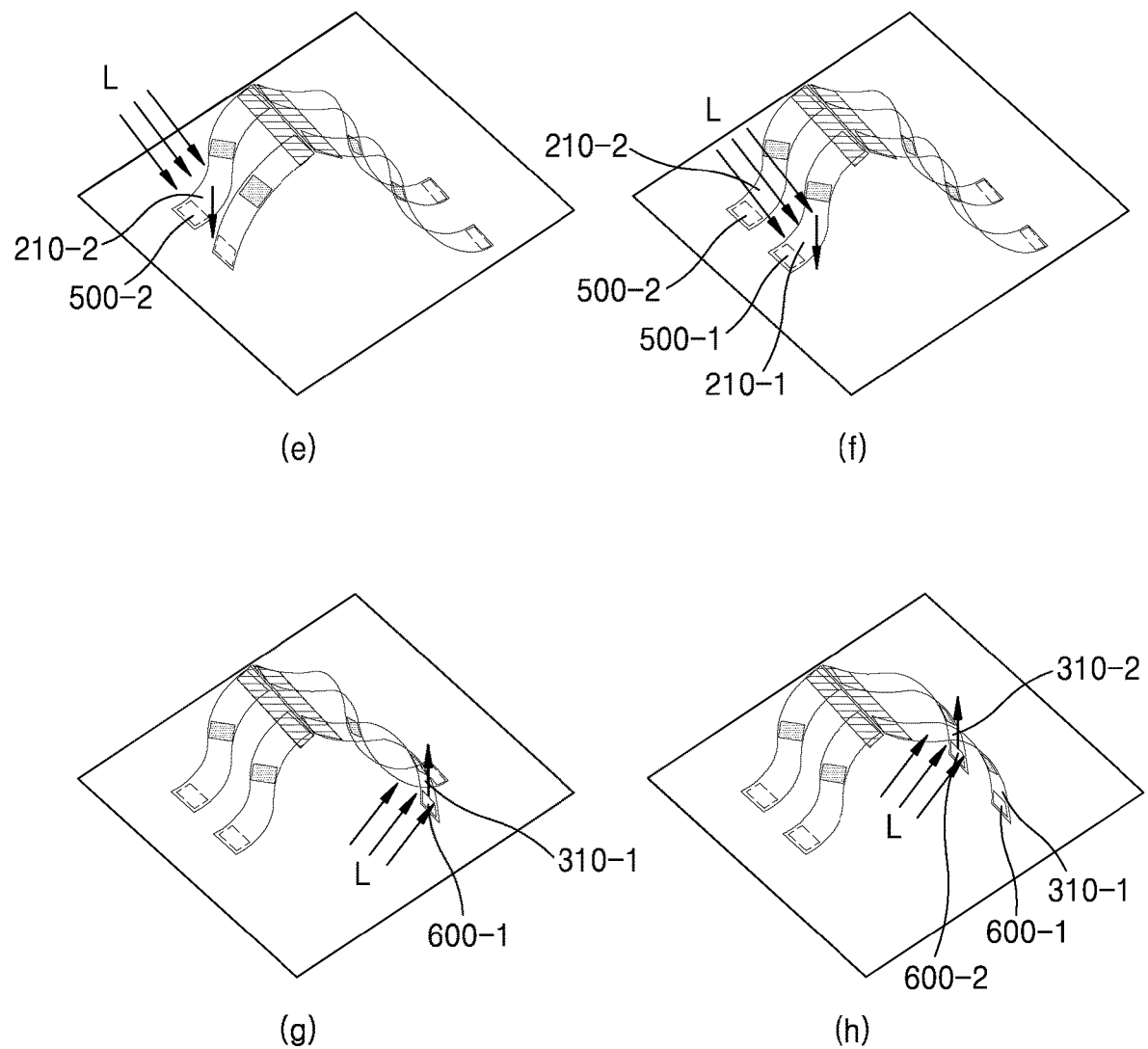
Figure 12:
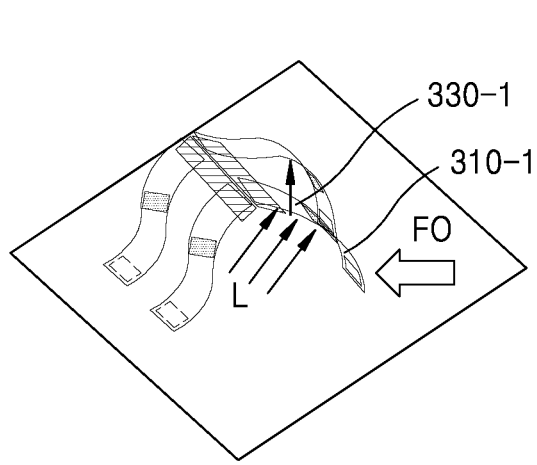
Figure 12:
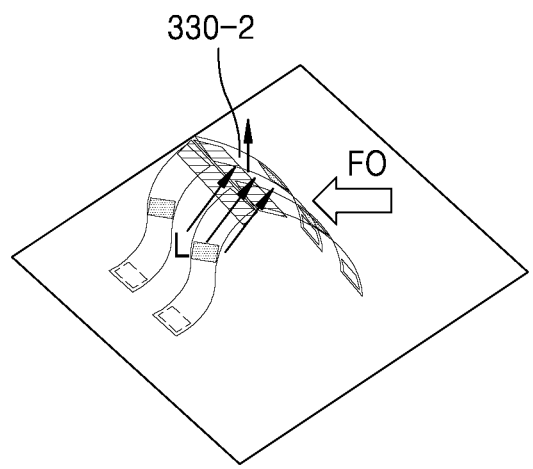
Figure 12:
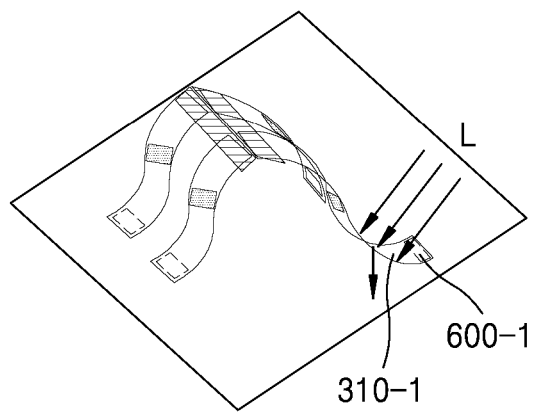
Figure 12:
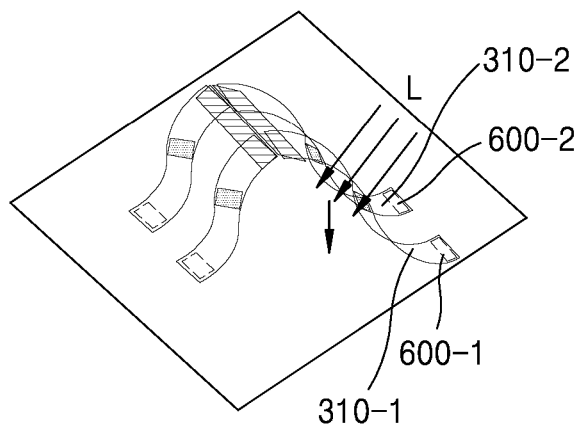

FIGS. 10 to 12 illustrate a forward movement process of a photo-responsive shape-changing structure 100' according to another embodiment of the present invention.

First, referring to (a) of FIG. 10, adhesive support portions 500 and 600 of both the first and second body portions 200 and 300 are in contact with the ground 20. That is, the 1-1 polymer film 210 and the 2-1 polymer film 310 may be in a bending deformation state so that predetermined areas of the lower parts thereof are in contact with the ground 20. The 1-2 polymer films 230-1 and 230-2 and the 2-1 polymer films 310-1 and 310-2 may be in the first shape (bent to the left), and the 1-1 polymer films 210-1 and 210-2 and the 2-2 polymer films 330-1 and 330-2 may be in the second shape (bent to the right). Therefore, the photo-responsive shape-changing structure 100' may remain stationary on the ground 20 without moving.

Then, referring to (b) and (c) of FIG. 10, the light emitter may emit light L sequentially or simultaneously to the rear surfaces of the 1-1 polymer film 210-1 and the 1-1 polymer film 210-2. The 1-1 polymer film 210-1 and the 1-1 polymer film 210-2 may be bent in the front direction and deformed from the second shape to the first shape. At the same time, the adhesive support portion 500-1 of the 1-1 polymer film 210-1 and the adhesive support portion 210-2 of the 1-1 polymer film 210-2 may be released from the contact with the ground 20 and separated from the ground 20.

Then, referring to (d) of FIG. 10, the light emitter may emit light L to the rear surfaces of the two 2-2 polymer films 330-1 and 330-2. The 2-2 polymer films 330-1 and 330-2 may be bent in the front direction and deformed from the second shape to the first shape. As the 2-2 polymer film 330 undergoes a bending deformation, it may apply a pressing force toward the front direction. Since the adhesive support portions 500-1 and 500-2 of the two first body portions 200-1 and 200-2 are not in contact with the ground 20, the pressing force may cause the first body portions 200-1 and 200-2 to move forward FW a predetermined distance.

Then, referring to (e) and (f) of FIG. 11, the light emitter may emit light L sequentially or simultaneously to the front surfaces of the 1-1 polymer film 210-1 and the 1-1 polymer film 210-2. The 1-1 polymer film 210-1 and the 1-1 polymer film 210-2 may be bent in the rear direction and deformed from the first shape to the second shape. As the 1-1 polymer film 210-1 and the 1-1 polymer film 210-2 are deformed into the second shape, the adhesive support portion 500-1 of the 1-1 polymer film 210-1 and the adhesive support portion 500-2 of the 1-1 polymer film 210-2 may come into contact with the ground 20 and the first body portions 200-1 and 200-2 may be fixed without moving by the contact of the adhesive support portions 500-1 and 500-2 with the ground 20.

Then, referring to (g) and (h) of FIG. 11, the light emitter may emit light L sequentially or simultaneously to the front surfaces of the 2-1 polymer film 310-1 and the 2-1 polymer film 310-2. The 2-1 polymer film 310-1 and the 2-1 polymer film 310-2 may be bent in the rear direction and deformed from the first shape to the second shape. Concurrently, the adhesive support portion 600-1 of the 2-1 polymer film 310-1 and the adhesive support portion 600-2 of the 2-1 polymer film 310-2 may be released from the contact with the ground 20 and separated from the ground 20.

Then, referring to (i) and (j) of FIG. 12, the light emitter may emit light L sequentially or simultaneously to the front surfaces of the 2-2 polymer film 330-1 and the 2-2 polymer film 330-2. The 2-2 polymer film 330-1 and the 2-2 polymer film 330-2 may be bent in the rear direction and deformed from the first shape to the second shape. Concurrently, the adhesive support portions 500-1 and 500-2 of the first body portions 200-1 and 200-2 may remain in contact with the ground 20 and may be pulled FO in the front direction as the 2-2 polymer films 330-1 and 330-2 are deformed into the second shape. Accordingly, the second body portions 300-1 and 300-2 may move forward.

Then, referring to (k) and (l) of FIG. 12, the light emitter may emit light L sequentially or simultaneously to the rear surfaces of the 2-1 polymer film 310-1 and the 2-1 polymer film 310-2. The 2-1 polymer film 310-1 and the 2-1 polymer film 310-2 may be bent in the front direction and deformed from the second shape to the first shape. As the 2-1 polymer film 310-1 and the 2-1 polymer film 310-2 are deformed into the first shape, the adhesive support portions 600-1 and 600-2 of the 2-1 polymer films 310-1 and 310-2 may come into contact with the ground 20, and the second body portions 300-1 and 300-2 may be fixed without moving by the contact of the adhesive support portions 600-1 and 600-2 with the ground 20.

The state shown in (l) of FIG. 12 is the same as the initial state shown in (a) of FIG. 10. By repeating the process of (a) of FIGS. 10 to (l) of FIG. 12, the photo-responsive shape-changing structure 100' may perform an operation of moving forward FW as if walking on four feet.

Figure 13:
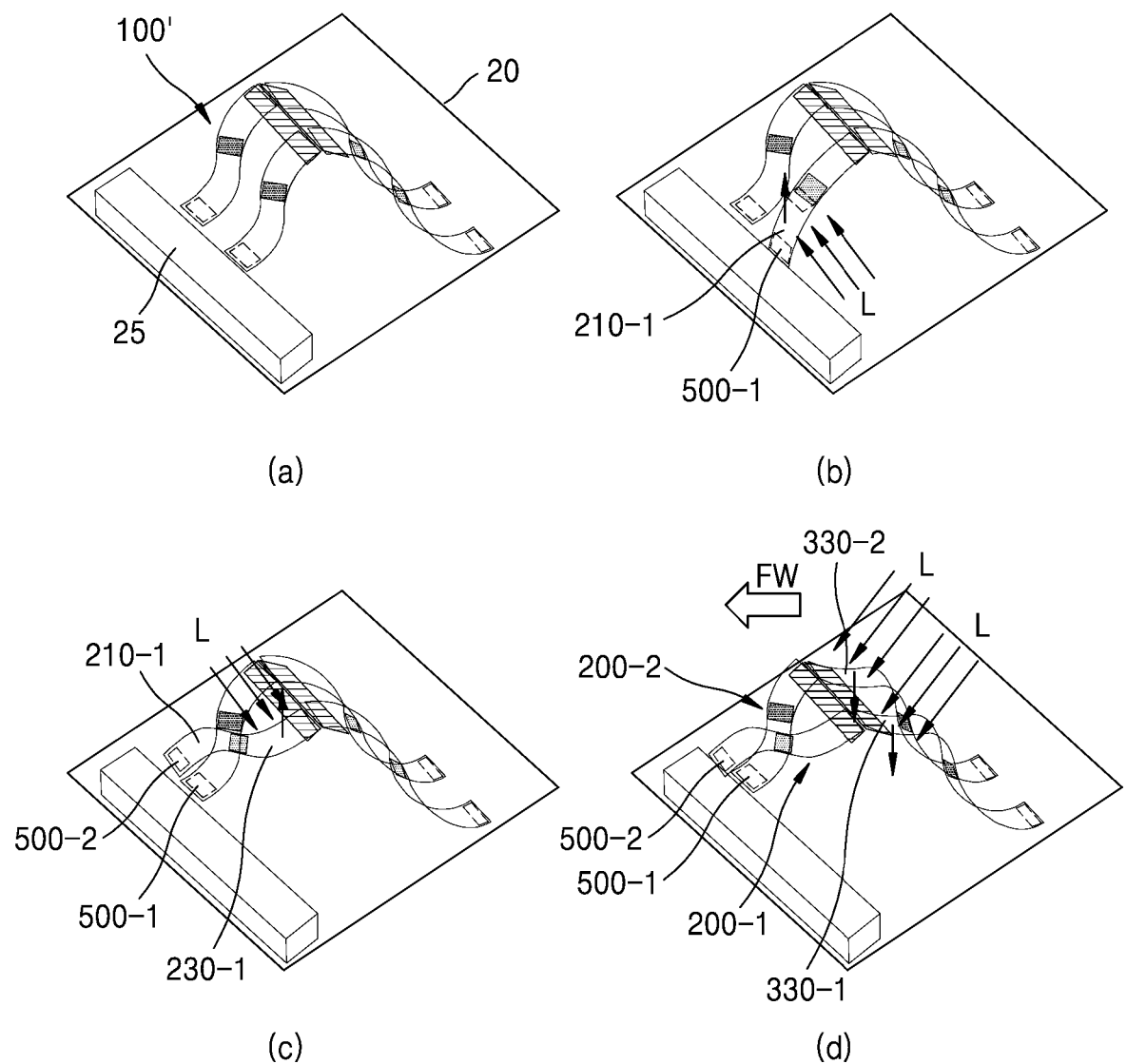
FIGS. 13 to 15 illustrate an ascending movement process of a photo-responsive shape-changing structure according to another embodiment of the present invention.
Figure 14:
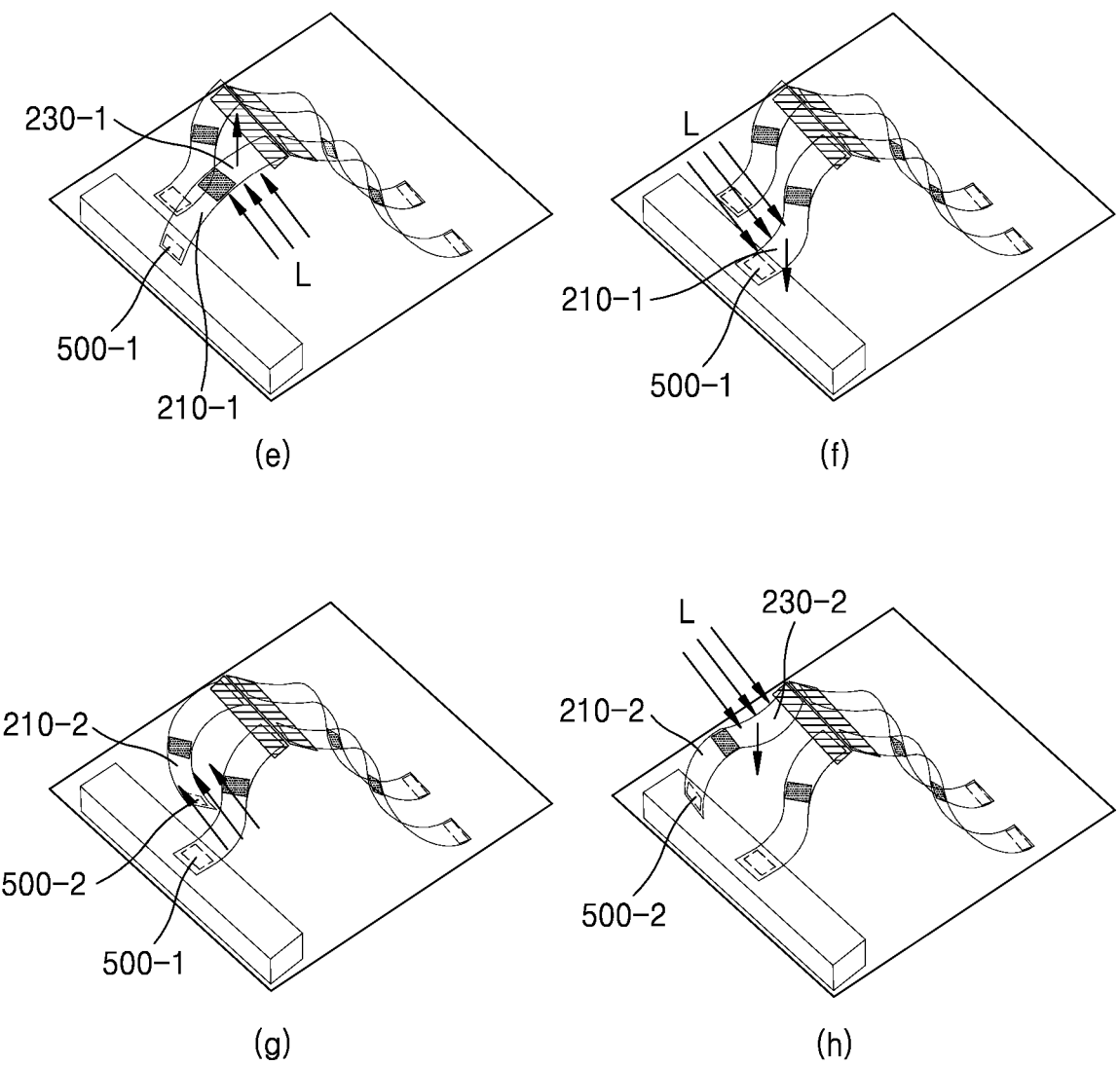
Figure 15:
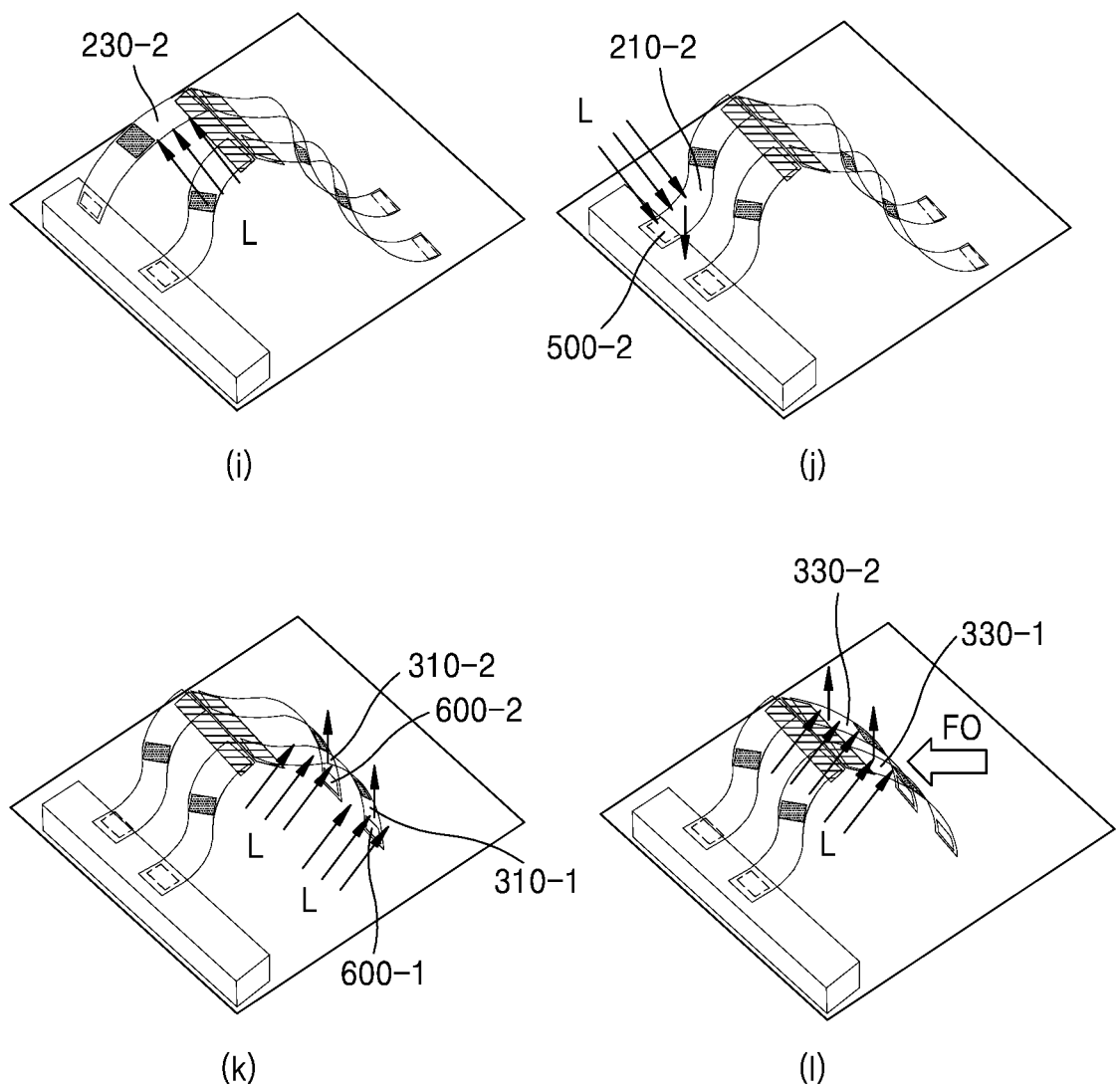

FIGS. 13 to 15 illustrating an ascending movement process of a photo-responsive shape-changing structure 100' according to another embodiment of the present invention.

First, referring to (a) of FIG. 13, the adhesive support portions 500 and 600 of both the first and second body portions 200 and 300 may be in contact with the ground 20. That is, the 1-1 polymer film 210 and the 2-1 polymer film 310 may be in a bending deformation state so that predetermined areas of the lower parts thereof are in contact with the ground 20. The 1-2 polymer films 230-1 and 230-2 and the 2-1 polymer films 310-1 and 310-2 may be in the first shape (bent to the left), and the 1-1 polymer films 210-1 and 210-2 and the 2-2 polymer films 330-1 and 330-2 may be in the second shape (bent to the right). Therefore, the photo-responsive shape-changing structure 100' may remain stationary on the ground 20 without moving.

On the ground 20, there is an obstacle 25, such as a step with a height from the ground 20.

Then, referring to (b) of FIG. 13, the light emitter may emit light L to the rear surface of the 1-1 polymer film 210-1. The 1-1 polymer film 210-1 may be bent in the front direction and deformed from the second shape to the first shape. At the same time, the adhesive support portion 500-1 of the 1-1 polymer film 210-1 may be released from the contact with the ground 20 and separated from the ground 20.

Then, referring to (c) of FIG. 13, the light emitter may emit light L to the front surface of the 1-2 polymer film 230-1. The 1-2 polymer film 230-1 may be bent in the rear direction and deformed from the first shape to the second shape. Due to the bending deformation of the 1-2 polymer film 230-1, the 1-1 polymer film 210-1 may be lifted away from the ground 20. In addition, the lowermost end of the 1-1 polymer film 210-1 may be positioned apart from an upper part of the obstacle 25.

Then, referring to (d) of FIG. 13, the light emitter may emit light L to the rear surfaces of the two 2-2 polymer films 330-1 and 330-2. The 2-2 polymer films 330-1 and 330-2 may be bent in the front direction and deformed from the second shape to the first shape. As the 2-2 polymer film 330 undergoes a bending deformation, it may apply a pressing force toward the front direction. The first body portion 200-1 may move forward FW a predetermined distance. In addition, since the adhesive support portion 500-2 is in contact with the ground 20, the first body portion 200-2 may temporarily condense a pressing force with the aid of the elasticity of the polymer film, without moving forward.

Then, referring to (e) of FIG. 14, the light emitter may emit light L to the rear surface of the 1-2 polymer film 230-1. The 1-2 polymer film 230-1 may be bent in the front direction and deformed from the second shape to the first shape. Due to the bending deformation of the 1-2 polymer film 230-1, the lowermost end of the 1-1 polymer film 210-1 may come into contact with the upper part of the obstacle 25.

Then, referring to (f) of FIG. 14, the light emitter may emit light L to the front surface of the 1-1 polymer film 210-1. The 1-1 polymer film 210-1 may be bent in the rear direction and deformed from the first shape to the second shape. As the 1-1 polymer film 210-1 is deformed into the second shape, the adhesive support portion 500-1 of the 1-1 polymer film 210-1 may come into contact with the upper part of the obstacle 25 and the first body portion 200-1 may be fixed without moving by the contact of the adhesive support portion 500-1 with the upper part of the obstacle 25.

Then, referring to (g) of FIG. 14, the light emitter may emit light L to the rear surface of the 1-1 polymer film 210-2. The 1-1 polymer film 210-2 may be bent in the front direction and deformed from the second shape to the first shape. At the same time, the adhesive support portion 500-2 of the 1-1 polymer film 210-2 may be released from the contact with the ground 20 and separated from the ground 20. In addition, the first body portion 200-1 may move partly in the front direction in response to the force temporarily condensed with the aid of the elasticity in (d) of FIG. 13.

Then, referring to (f) of FIG. 14, the light emitter may emit light L to the front surface of the 1-2 polymer film 230-2. The 1-2 polymer film 230-2 may be bent in the rear direction and deformed from the first shape to the second shape. Due to the bending deformation of the 1-2 polymer film 230-2, the lowermost end of the 1-1 polymer film 210-2 may be positioned apart from the upper part of the obstacle 25.

Then, referring to (i) of FIG. 15, the light emitter may emit light L to the rear surface of the 1-2 polymer film 230-2. The 1-2 polymer film 230-2 may be bent in the front direction and deformed from the second shape to the first shape. Due to the bending deformation of the 1-2 polymer film 230-2, the lowermost end of the 1-1 polymer film 210-2 may come into contact with the upper part of the obstacle 25.

Then, referring to (j) of FIG. 15, the light emitter may emit light L to the front surface of the 1-1 polymer film 210-2. The 1-1 polymer film 210-2 may be bent in the rear direction and deformed from the first shape to the second shape. As the 1-1 polymer film 210-2 is deformed into the second shape, the adhesive support portion 500-2 of the 1-1 polymer film 210-2 may come into contact with the upper part of the obstacle 25 and the first body portion 200-2 may be fixed without moving by the contact of the adhesive support portion 500-2 with the upper part of the obstacle 25.

Then, referring to (k) of FIG. 15, the light emitter may emit light L sequentially or simultaneously to the front surfaces of the 2-1 polymer film 310-1 and the 2-1 polymer film 310-2. The 2-1 polymer film 310-1 and the 2-1 polymer film 310-2 may be bent in the rear direction and deformed from the first shape to the second shape. Concurrently, the adhesive support portion 600-1 of the 2-1 polymer film 310-1 and the adhesive support portion 600-2 of the 2-1 polymer film 310-2 may be released from the contact with the ground 20 and separated from the ground 20.

Then, referring to (l) of FIG. 15, the light emitter may emit light L sequentially or simultaneously to the front surfaces of the 2-2 polymer film 330-1 and the 2-2 polymer film 330-2. The 2-2 polymer film 330-1 and the 2-2 polymer film 330-2 may be bent in the rear direction and deformed from the first shape to the second shape. Concurrently, the adhesive support portions 500-1 and 500-2 of the first body portions 200-1 and 200-2 may remain in contact with the ground 20 and may be pulled FO in the front direction as the 2-2 polymer films 330-1 and 330-2 are deformed into the second shape. Accordingly, the second body portions 300-1 and 300-2 may move forward.

By repeating the process of FIGS. 13 to 15, the photo-responsive shape-changing structure 100' may move forward as if walking on four feet and perform an operation of ascending the obstacle 25.

The photo-responsive shape-changing structure 100' is not limited to the embodiments illustrated in FIGS. 10 to 15, and it is noted that various modifications may be made by combining the direction and order of light irradiation for the polymer film.

As described above, the present invention has an effect in that bending deformation can be controlled using cis-trans conversion of an azobenzene liquid crystal polymer and moving, walking, ascending, descending, and the like are possible in response to light irradiation. In addition, the photo-responsive shape-changing structure undergoes a reaction through light of a specific bandwidth without thermal reaction, and since the reaction is a reversible reaction, it is possible for repetitive behavior to occur, so that a constant motion can be continuously repeated.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

The invention claimed is:

1. A photo-responsive shape-changing structure comprising:
    a first body portion comprising at least one polymer film that undergoes a bending deformation in response to light irradiation;
    a second body portion comprising at least one polymer film that undergoes a bending deformation in response to light irradiation; and
    a connection portion configured to allow the first body portion and the second body portion to be connected to each other,
    wherein adhesive support portions are formed at one ends of the first body portion and the second body portion, which are in contact with the ground.

2. The photo-responsive shape-changing structure of claim 1, wherein the first body portion comprises a 1-1 polymer film and a 1-2 polymer film that each undergo a bending deformation in response to light irradiation and the second body portion comprises a 2-1 polymer film and a 2-2 polymer film that each undergo a bending deformation in response to light irradiation.

3. The photo-responsive shape-changing structure of claim 2, wherein a first restricting portion is formed between the 1-1 polymer film and the 1-2 polymer film and a second restricting portion is formed between the 2-1 polymer film and the 2-2 polymer film.

4. The photo-responsive shape-changing structure of claim 1, wherein the polymer film comprises a polymer scaffold film, an azobenzene liquid crystal polymer applied on a surface of the polymer scaffold film by immersing the film in the polymer, and a protective film attached to a surface of the azobenzene liquid crystal polymer.

5. The photo-responsive shape-changing structure of claim 1, wherein an adhesive strength between the adhesive support portions and the ground is less than a force that causes bending deformation of the polymer film upon light irradiation.

6. The photo-responsive shape-changing structure of claim 1, wherein the connection portion connects the other ends of the first body portion and the second body portion to each other and acts as a joint to allow for bending or twisting deformation of the first body portion and the second body portion.

7. The photo-responsive shape-changing structure of claim 1, wherein the first body portion and the second body portion are provided in plurality.

\* \* \* \* \*